(12) United States Patent
Morales-Pavon (10) Patent No.: US 8,712,788 B1
(45) Date of Patent: Apr. 29, 2014

(54) METHOD OF PUBLICLY DISPLAYING A PERSON'S RELATIONSHIP STATUS

(71) Applicant: Nadira S. Morales-Pavon, Coconut Creek, FL (US)

(72) Inventor: Nadira S. Morales-Pavon, Coconut Creek, FL (US)

( * ) Notice: Subject to any disclaimer, the term of this patent is extended or adjusted under 35 U.S.C. 154(b) by 0 days.

(21) Appl. No.: 13/753,613

(22) Filed: Jan. 30, 2013

(51) Int. Cl.
*G06Q 30/02* (2012.01)
*G06Q 10/10* (2012.01)
*G06Q 10/06* (2012.01)
*G06Q 30/06* (2012.01)
*G06Q 10/08* (2012.01)
*G06Q 50/00* (2012.01)

(52) U.S. Cl.
CPC ........................................ *G06Q 50/01* (2013.01)
USPC ............................................ 705/1.1; 705/319

(58) Field of Classification Search
USPC ............................................................ 705/1.1
See application file for complete search history.

(56) References Cited

U.S. PATENT DOCUMENTS

| | | | |
|---|---|---|---|
| 5,950,200 A | 9/1999 | Sudai et al. | |
| 7,788,247 B2 | 8/2010 | Wang et al. | |
| 8,024,312 B2 | 9/2011 | Wang et al. | |
| 8,099,433 B2 | 1/2012 | Sittig et al. | |
| 8,224,359 B2 | 7/2012 | Marlow et al. | |
| 8,423,622 B2 * | 4/2013 | Jhanji | 709/206 |
| 2005/0261032 A1 * | 11/2005 | Seo et al. | 455/566 |
| 2006/0098027 A1 * | 5/2006 | Rice et al. | 345/619 |
| 2006/0106631 A1 | 5/2006 | Waller | |
| 2007/0113181 A1 * | 5/2007 | Blattner et al. | 715/706 |
| 2008/0141138 A1 * | 6/2008 | Kalaboukis et al. | 715/741 |
| 2009/0164498 A1 * | 6/2009 | Melcher | 707/102 |
| 2009/0300525 A1 * | 12/2009 | Jolliff et al. | 715/764 |
| 2010/0094936 A1 * | 4/2010 | Simonen et al. | 709/204 |
| 2010/0177812 A1 * | 7/2010 | O'Shaughnessy et al. | 375/224 |
| 2012/0210253 A1 * | 8/2012 | Luna et al. | 715/753 |
| 2012/0278418 A1 * | 11/2012 | Heron et al. | 709/206 |
| 2012/0290979 A1 * | 11/2012 | Devecka | 715/810 |
| 2013/0137464 A1 * | 5/2013 | Kramer et al. | 455/456.3 |

OTHER PUBLICATIONS

Author Unknown, Relationship Status for Facebook, Oct. 29, 2012, available at https://play.google.com/store/apps/details?id=br.com.owlapps.relationship.facebook&hl=en.
Author Unknown, RelationBook, Oct. 29, 2012, available at http://relationbook.me/.
Author Unknown, Cool Photo Frames android future, Oct. 29, 2012, available at https://play.google.com/store/apps/details?id=com.androidfuture.cool.framesfree&hl=en.

* cited by examiner

*Primary Examiner* — Jonathan Ouellette
(74) *Attorney, Agent, or Firm* — The Concept Law Group, P.A.; Scott D. Smiley; Mark C. Johnson (57) ABSTRACT

A method of displaying a user's relationship status that includes receiving a user-identifying image at an electronic computing device, selecting from a plurality of pre-defined recognizable personal-status identifiers at least one personal-status identifier indicative of a personal status of the user, at least partially surrounding the user-identifying image with a frame-like image, the frame-like image having a unique visual perception characteristic corresponding to the selected at least one personal-status identifier indicative of a personal status of the user and leaving the user-identifying image substantially unobstructed, and uploading the user-identifying image with the frame-like image to at least two different social networks so that the image is visually accessible to users on the at least two different social networks.

20 Claims, 7 Drawing Sheets

METHOD OF PUBLICLY DISPLAYING A PERSON'S RELATIONSHIP STATUS

FIELD OF THE INVENTION

The present invention relates generally to methods of displaying a person's relationship status, and more particularly relates to a method of electronically communicating and displaying a person's social relationship status, interests, and image to the viewing public.

BACKGROUND OF THE INVENTION

Finding love and forming relationships are, and have always been, essential ingredients to the fabric of human culture. Those people in relationships or in love are trying to maintain those feelings and associations and those persons not in relationships or in love are attempting to find or form the same. As primarily used herein, "relationships" generally refer to social relationships but shall not necessarily be so limited. For many persons attempting to find love and form relationships, the process can be time consuming, stressful, somewhat confusing, and even daunting at times. Many people are unaware, or bashful, of how to initiate conversations concerning their and others' relationship status. Many people also find it problematic to notify others of a change to, or to update, their relationship status, especially to the public at large. It is also well known that many people desire to see what another person looks like before they engage in conversations that may lead to a potential relationship.

Many people turn to public dating websites and networking groups to help find a relationship and initiate conversations with other people. These websites and groups, however, often take a considerable amount of time to register and navigate through. As most of these websites and networking groups are based on complex integrated relationship parameters used to match and find "compatible" people for the user, they require significant amounts of personal information that many people find too intrusive. These websites and groups also generally require membership fees or operational costs that many users find undesirable. Also particularly disadvantageous to the user is the fact that your relationship status is only relayed to those other members of the website or networking group, such that the sample size of the public-at-large is minimal. As such, a user is unable to transfer and display their image, in addition their personal status, to a larger percentage of the viewing public.

Some known methods and applications utilize a combination of shapes, shape outlines, and colors to indicate a user's desired relationship status, sexual orientation, or other interests. These shapes are cascaded over one another to represent the multiple attributes of a user. The combination of these shapes form a "tag" that has a plurality of various combinations and components dependent on the user's characteristics and attributes. These methods are particularly disadvantageous as they are combined and do not allow it to be used in combination with an image of the user. Further, the multiple shapes, colors, and shape outlines require a member of the viewing public to remember and ascertain which component of the tag represents a user's relationship status. Moreover, these methods are also limited to its application on physical objects, e.g., clothing, bumper stickers, suitcases, such that they are not adaptable to be used on all social media accounts or displayed and communicated electronically over the interne.

Some other known methods employ portions of a social media page to display the user's relationship status. These methods suffer from many of the above-described disadvantages, in addition to requiring many of those members of the viewing public to also subscribe to the social media account before being able to view the user's relationship status. Moreover, these methods do not permit a member of the public to view an image of the user while simultaneously ascertaining the user's relationship status. Moreover, if the user experiences a relationship or emotional status change, the user is required to update all accounts or webpages.

Other known methods have attempted to effectively relay and notify the viewing public of a user's relationship status and change thereof, but they too have fallen short of a time- and cost-effective approach that has broad application. One known method requires a user to login to a server that is operable to access all of a user's social media accounts and update a user's relationship status. This method, however, is limited to only those social media accounts which the user preregisters with and is not compatible with all social media accounts or servers. The viewing public also has to navigate to the particular section of the social media web page that displays the user's relationship status and in some instances requires each member of the viewing public to have access to the user's relationship status. This method also does not permit a member of the viewing public to view an image of the user simultaneously with the user's relationship status.

Some other known methods utilize "tags," or manually inserted descriptions, in combination with a photo or a user's image. For example, one known method attaches the name of a user represented in a photo and, when a member of the viewing public scrolls over the image of the user, his or her name appears. These tagging methods are disfavored by many users as the tags do not instantaneously relay a user's relationship status. They are also generally limited to the infrastructure of the software employed to implement the social media webpage and therefore are unable to be used on different social media accounts or unable to be utilized outside of the context of the social media account. As such, these methods have limited versatility and use in their application. In addition, these tagging methods are also generally incapable of being used with some operating systems, specifically those mobile applications and systems that do not incorporate the ability for the member of the viewing public to operate a cursor.

Therefore, a need exists to overcome the problems with the prior art as discussed above.

SUMMARY OF THE INVENTION

The invention provides a method of electronically communicating a user's relationship status that overcomes the hereinafore-mentioned disadvantages of the heretofore-known devices and methods of this general type and that effectively and efficiently displays the relationship status or interests of a user, simultaneously with that user's image, to the viewing public.

With the foregoing and other objects in view, there is provided, in accordance with the invention, a method of displaying a user's relationship status that includes receiving a user-identifying image at an electronic computing device, selecting from a plurality of pre-defined recognizable personal-status identifiers at least one personal-status identifier indicative of a personal status of the user, at least partially surrounding the user-identifying image with a frame-like image, the frame-like image having a unique visual perception characteristic corresponding to the selected at least one personal-status identifier indicative of a personal status of the user and leaving the user-identifying image substantially unobstructed, and uploading the user-identifying image with the frame-like image to at least two different social networks so that the image is visually accessible to users on the at least two different social networks.

In accordance with another feature, an embodiment of the present invention includes the at least two different social networks are not affiliated with one another.

In accordance with a further feature of the present invention, the user-identifying image comprises at least one of a user's physical likeness or a user's facial likeness.

In accordance with an additional feature of the present invention, the electronic computing device is a mobile electronic computing device.

In accordance with yet another feature of the present invention, the unique visual perception characteristic is at least one of a color and a pattern.

In accordance with an added feature, an embodiment of the present invention includes at least one of the user-identifying image and the frame-like image further having a source indicator coupled thereto, the source indicator providing the users on the at least two different social networks access to the list of pre-defined recognizable personal-status identifiers and their associated unique visual perception characteristic.

In accordance with a further feature, an embodiment of the present invention includes providing a key having a list of the pre-defined recognizable personal-status identifiers and their associated unique visual perception characteristic and then making the key accessible to at least one user.

In accordance with a further feature of the present invention, access to the key is restricted to members of an exclusive group.

In accordance with the present invention, a method for displaying a user's relationship status also includes communicating an image of a user's physical likeness to an electronic computing device, selecting one of a plurality of pre-pre-defined recognizable personal-status identifiers indicative of a personal status of the user, substantially encapsulating the image of the user's physical likeness with a border, the border leaving the image of the user's physical likeness substantially unobstructed and having a unique visual perception characteristic corresponding to the selected pre-defined personal-status identifier. The inventive method also includes receiving the image of the user's physical likeness with the border at a social network, the social network having a social network server communicatively coupled over a network with the electronic computing device, and displaying the image of the user's physical likeness with the border to users on the social network.

In accordance with another feature, an embodiment of the present invention also includes receiving the image of the user's physical likeness with the border at at least two different social networks, the at least two different social networks each having a social network server communicatively coupled over a network with the electronic computing device and then displaying the image of the user's physical likeness with the border to users on the at least two different social networks.

Also in accordance with the present invention is a computer readable medium having embodied thereon a program, the program being executable by a processor for performing a method for displaying a user's relationship status with the method including accessing a user-identifying image, selecting from a plurality of pre-defined recognizable personal-status identifiers at least one personal-status identifier indicative of a personal status of the user, at least partially surrounding the user-identifying image with a frame-like image, the frame-like image having a unique visual perception characteristic corresponding to the selected at least one personal-status identifier indicative of a personal status of the user and leaving the user-identifying image substantially unobstructed, and then uploading the user-identifying image with the frame-like image to at least two different social networks so that the image is visually accessible to users on the at least two different social networks.

Although the invention is illustrated and described herein as embodied as a method of publicly displaying a person's relationship status, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "application," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient method of displaying a user's relationship status to a member of the viewing public through use of an image of a user and a corresponding relationship status of that user. Embodiments of the invention also incorporate various frames and borders to a responding relationship status to accentuate the user's image. As such, the present invention provides a method of effectively and efficiently, displaying, or communicating, a user's relationship status in connection with an image provided by the user.

Figure 1:
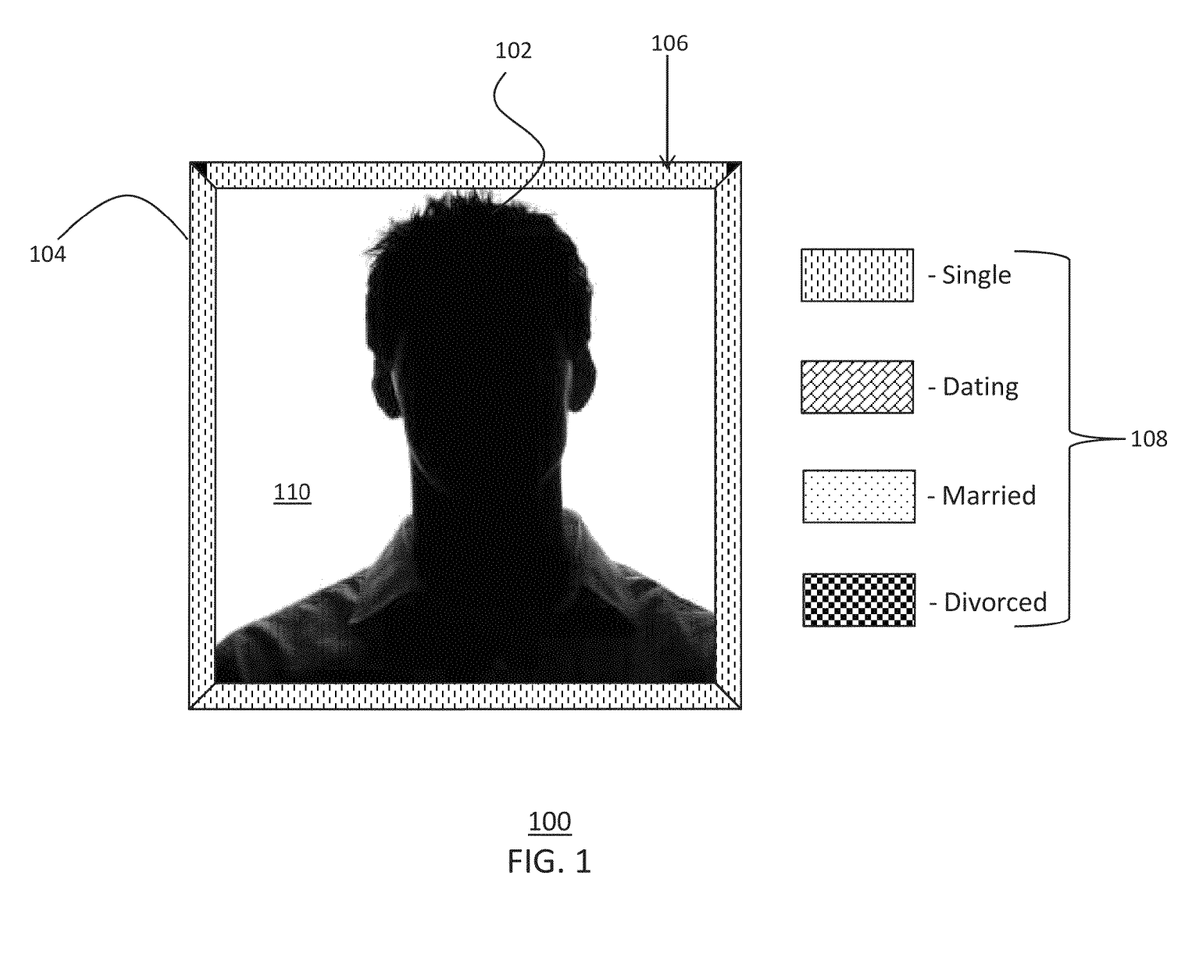
FIG. 1 is an illustrative view of a user-status-identifying image having a user-identifying image and a frame-like image surrounding the user-identifying image in accordance with the present invention.

Referring now to FIG. 1, one end result of the inventive method is illustrated. FIG. 1 shows several advantageous features of the present invention, but, as will be described below, the inventive method can produce variations of the illustration shown in FIG. 1, which may be embodied in several shapes, sizes, combinations of features and components, and varying numbers and functions of the components. FIG. 1 illustrates an exemplary user-status-identifying image 100 in accordance with the present invention. The user-status-identifying image 100 includes a user-identifying image 102 and a frame-like image 104. The frame-like image 104 can be seen surrounding a perimeter, or the outer edges, of the user-identifying image 102. The term "user," as used herein, is referred to as the person having their relationship status, or other personal status, communicated/displayed to at least one member of a viewing public that is not the user him or herself. As shown in FIG. 1, the user is associating the relationship status of "single" to the user-identifying image 102.

In one embodiment, the user-identifying image 102 is a user's physical likeness, i.e., user-identifying characteristics or features typically unique to each person. This may include any portion of the user's body and the corresponding shape, color, or clothing associated therewith. FIG. 1 and the corresponding figures of the instant application reflect a general outline of a user to represent an image of the user that would ordinarily have identifying features, e.g., eyes, nose, etc. In other embodiments the user-identifying image 102 is at least the user's facial likeness. In further embodiments the user-identifying image 102 may include a vehicle, a house, a pet, a textual name, or another object or image that the user desires to identify with him or herself. The image 102 may be an actual photo of the user that is subjected to digital image processing or a digital image that is captured and stored using known methods of image capturing and processing. In other embodiments, the user's image may be an illustration, a sequence of still images in motion (e.g., a video), or other representation of the user that sufficiently represents the likeness of the user.

The frame-like image 104 may completely surround the user-identifying image 102 or may be at least partially surrounding the user-identifying image 102 to effectively display and encapsulate the user-identifying image 102. The frame-like image 104 can also be seen having a unique visual perception characteristic 106 associated therewith. FIG. 1 illustrates an exemplary characteristic 106 embodied in a series of dashed vertical lines. In other embodiments, the characteristic 106 may be checkerboard, dots, diagonal brick, a particular color, a particular shape, or any other characteristic visually perceived by the user. Each visual perception characteristic 106 represents one of a plurality of personal-status identifiers 108 indicative of a personal status of the user such that it would be considered "unique," relative to another visual perception characteristic 106. Said another way, no two of the same visual perception characteristics 106 would represent the same one of the plurality of personal-status identifiers 108. As such, the viewing public is able to quickly ascertain what the user's relationship status is by identifying the particular visual perception characteristic 106 associated therewith. In further embodiments, the user-status-identifying image 100 may have a plurality of frame-like images 104 cascading one another to produce a user-status-identifying image 100 that depicts a plurality of personal statuses of a user.

FIG. 1 illustrates an exemplary list of personal-status identifiers 108 that may represent each particular visual perception characteristics 106. For example, these personal-status identifiers 108, representing a user's or person's personal status, may include "single," "dating," "single, but not dating," "married," "divorced," "widowed," or any other personal status of the user. In other embodiments of the present invention, the personal-status identifiers 108 may be emotional responses such as "happy," "sad," "grieving," "scared," and the like. The personal-status identifiers are considered "recognizable" in that they are known and defined words to represent a relationship or emotional status of a person. In one embodiment, the personal-status identifiers 108 are not shown to the viewing public in connection with the user-status-identifying image 100. It is envisioned that widespread use, marketing, and advertising of the inventive method will enable those members of the viewing public who haven't used the inventive method themselves to identify what each unique visual perception characteristic 106 is associated with. If the member of the viewing public is unaware of what the unique visual perception characteristic 106 signifies, then the member is suggested to conduct a web search to define said characteristic 106.

In other embodiments, the personal-status identifier 108 may reference the user's religion, culture, ethnicity, location, or other associating characteristic. Further, the user-status-identifying image 100 may also include secondary personal-status identifiers 108 which have their own associated unique visual perception characteristic 106 that is incorporated into the frame-like image 104. For example, the frame-like image 104 may have shamrocks surrounding the user's image with the outline of each shamrock encapsulating dashed vertical lines. This would be indicative of a single person with an Irish background.

In other embodiments, the user-status-identifying image 100 may have a Trademark, website address, hyperlink or other source indicator to facilitate those inquiring members of the viewing public in tracing the significance of the unique visual perception characteristic 106. Should the user-status-identifying image 100 include one or more embedded hyperlinks that direct a member of the viewing public to a source (also known in the art as an "anchor"), this would allow information to be ascertained as to what each visual perception characteristic 106 signifies or corresponds to. The anchor may include a domain or web address where information on what the visual perception characteristic 106 can be found. Alternatively, the hyperlink may also be what is known as an "inline link" or a link that displays remote content without the need for embedding the content. Additionally, the hyperlink may be bi-directional or capable of being followed in two directions, i.e., the location of the user-status-identifying image 100 and the anchor.

In even further embodiments, a user is provided with a key, or an association tool, used to match each of the visual perception characteristics 106 with a list of recognizable personal-status identifiers 108. In one embodiment, the administrator of the exemplary method charges a monetary amount for they key, such that the user (or any member of the viewing public) will be able to ascertain what other visual perception characteristics 106 correspond to what recognizable personal-status identifiers 108. In certain embodiments, access to the keys is restricted to members of an exclusive group. This beneficially enables only those members of the group to ascertain what the status of a particular user is. For example, if a school has particular network of children that only desires other members of that group, i.e., other children, to know each other's relationship or other personal status, the key would prevent other unwanted viewers of the public from ascertaining a particular child's personal status.

In some embodiments, as shown in FIG. 1, the exemplary list of personal-status identifiers 108 is shown in combination with the user-status-identifying image 100. As such, an administrator or developer utilizing the inventive method may associate any number of emotional, cognitive, or interpersonal responses with the visual perception characteristic 106. This, coupled with its connection with the user's image 102, presents a novel and advantageous way to effectively communicate a user's image and relationship status, among other things, to the viewing public. As many people are immediately concerned with what another person looks like and that person's relationship status, the present invention also provides an extremely efficient remedy to those concerns.

The frame-like image 104 can be seen surrounding the image to effectuate an adequate presentation of the user-identifying image 102 in an aesthetically pleasing form. As mentioned, the frame may have a color easily identitifiable with a personal-identifying characteristic. In one embodiment, the frame-like image 104 may surround the entire image 102, including those portions 110 outside of the image 102. In other embodiments, the frame-like image 104 may surround the actual image of the user, excluding those portions 110. The frame-like image 104 may also slightly encroach on the image 102 itself, but still be considered "surrounding" and "non-obstructing" the image 102. Regardless, the term "surrounding" includes those embodiments in addition to those embodiments where portions of the frame-like image 104 may be removed or missing. The frame-like image 104 also substantially un-obstructs the user-identifying image 102 to assure the user's image is being displayed to the viewing public. Opposed to those other known methods, the user-status-identifying image 100 quickly and advantageously communicates the personal status of a user to the viewing public while simultaneously displaying the user's image.

Figure 2:
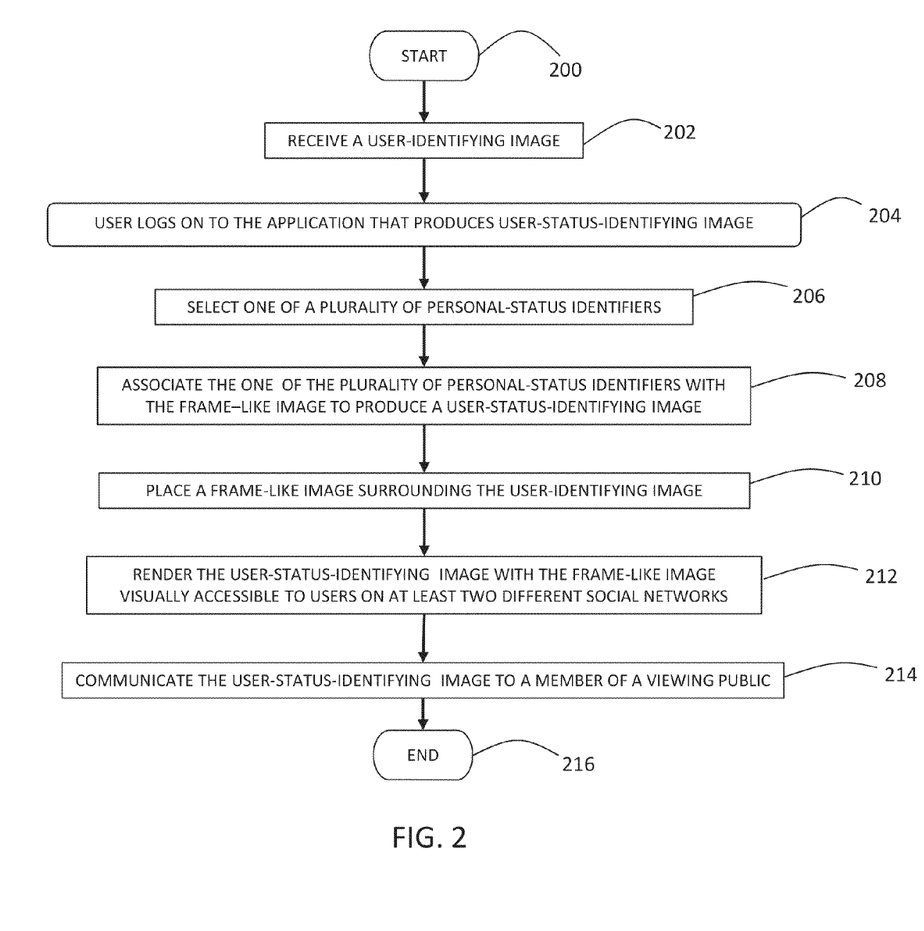
FIG. 2 is a process flow chart representing an exemplary method of displaying a user's relationship status in accordance with the present invention.
Figure 3:
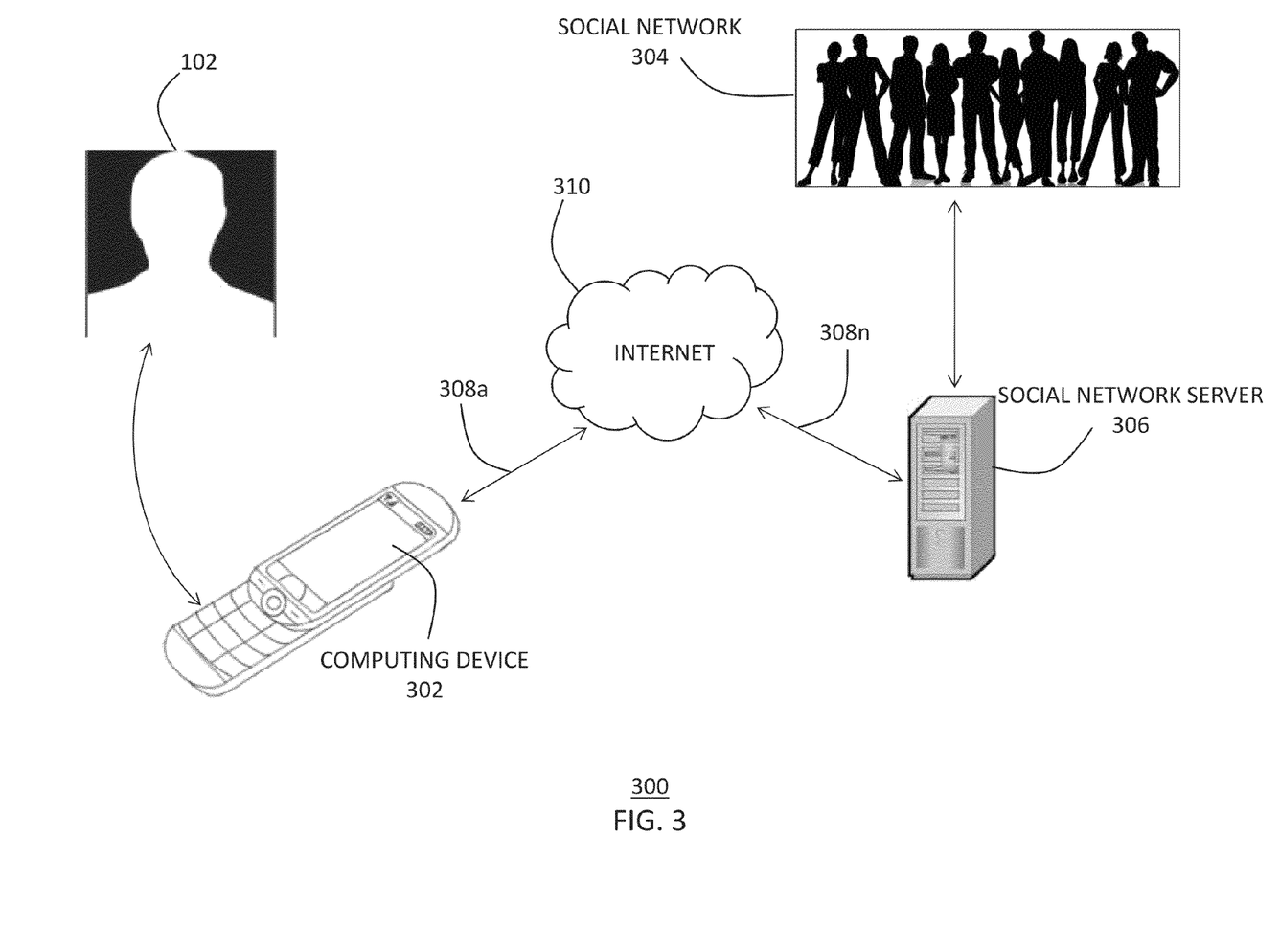
FIG. 3 is a block diagram of an exemplary data processing network having a computing device, a social media server, and at least one member of a viewing public with device communicatively coupled to the network, in accordance with an embodiment of the present invention.

With reference now to both FIGS. 2 and 3, FIG. 2 depicts an exemplary process flow chart representing the method of electronically communicating a user's relationship status, while FIG. 3 depicts a block diagram of an exemplary network 300 upon which the present invention may be implemented. The process starts at step 200 and immediately proceeds to step 202 of receiving the user-identifying image 102 at an electronic computing device 302. A processor implementing the inventive process may also have access to the user-identifying image 102 to carry out the steps set forth herein. The electronic computing device 302 may be any device operating on electricity and capable of receiving and processing data. In one embodiment, the electronic computing device 302 is a mobile device, e.g., cellular phone, as shown in FIG. 3. In other embodiments the electronic computing device 302 is a desktop computer, tablet, or other computing device. Further, the user-identifying image 102 may be received directly through an image capturing assembly, e.g., a camera, residing on the computing device 302 or may be captured and digitally converted to a computer-readable medium and transferred to the computing device 302.

The process continues to the step 204 of logging in to a software application that carries out the steps that produce the user-status-identifying image 100 (shown in FIG. 1.). In one embodiment, the user logs into an account residing on a server connected to the network 300 or onto the application residing on the computing device 302. The user account may provide the user with the ability to store information or data onto a database for use at a later date. To log into the user account or obtain access to previously stored information, the user may communicate, and the server or computing device 302 would receive, a user identifier. The user identifier may consist of a user name and/or password that may consist of numeric, alpha-numeric, or other text or data capable of verifying the identity of the user. As such, a user may beneficially store preferences, which may include a list of preferred personal-status identifiers 108, which would permit a user to efficiently associate with an image and carryout the steps of the present invention. In other embodiments, the application is operable and the steps of the present invention are operable without a user identifier or without a user or person logging in.

The process continues to step 206 of selecting one (or in some embodiments, more than one) of a plurality of recognizable personal-status identifiers 108 (as shown in FIG. 1) that is indicative of a personal status of the user or that the user identifies with. In one embodiment, the user selects from a pre-defined list of personal status identifiers 108. In other embodiments, the user may manually insert their own personal status identifier 108 or any combination of the above. It should be noted that although the user may be the person selecting the personal-status identifier 108, the present invention shall not be so limited. In other embodiments, the software application or server selects the user's personal-status identifier 108 from a pre-determined user selection, typically occurring at registration. Moreover, in further embodiments the personal-status identifier 108 may be selected by another member of the viewing public that is not the user, i.e., a non-user. This process would involve the member of viewing public having access to the user-identifying image 102 and selecting the appropriate personal-status identifier 108 that represents the personal status of the user depicted in the image 102.

Following step 206, step 208 includes associating the one of the plurality of personal-status identifiers 108 with the frame-like image 102 or border to produce or generate the user-status-identifying image 100 (shown in FIG. 1). This may occur through one or more programs operated by a processor, as described herein, that carryout the steps of the application.

The process proceeds from step 208 to the step 210 of placing the frame-like image 104 (shown in FIG. 1) at least partially surrounding the user-identifying image 102. Said differently, step 206 may also include placing a border at an outer extremity of the image 102 to substantially encapsulate the image 102. The term "substantially encapsulate," in reference to the user's identifying image, is defined as having the identifying characteristic(s) of the user being enclosed within the object that is doing the encapsulating. The term "border" may be any part or edge of a surface of a referencing object that forms that object's boundary. Again, the image 102 may include the physical likeness of the user and/or all (or none) of those portions 110 (shown in FIG. 1) outside of the physical likeness of the user but yet still be considered part of the image 102.

Next, step 212 includes rendering, uploading, or furnishing, the user-identifying image 102 with the frame-like image to at least two different social networks 304 so that it is visually accessible to users on the at least two different social networks 304. The term "social networks" is defined as any social structure, typically accessible over a computer network, made up of actors (individuals or organizations). The social network 304 facilitates the building of social relations among people or organizations by, for example, sharing interests, activities, backgrounds, schedules, or other real-life or fictional connections. Some exemplary social networks include Facebook, FourSquare, MySpace, YouTube, Twitter, Huffington Post, and LinkedIn among others. Once the user-status-identifying image 100 is rendered, it may be visually accessible to users on at least two different social networks 304. This advantageously permits a person to display an image of themselves to a broader range of the viewing public, while simultaneously conveying the person's personal status.

In one embodiment, the different social networks 304 are affiliated with one another. In other embodiments, the social networks 304 are not affiliated with one another. Regardless, the user-status-identifying image 100 can be displayed and communicated to multiple, and potentially endless, social networks 304 which allow the user to display their image and personal status to greater percentage of the viewing public, as opposed to those known prior-art cites which limit the display to a single social network 304.

As shown in step 214, the user-status-identifying image 100 may be communicated by a user or non-user, through one of the at least two different social networks 304, to a member of the viewing public. Said another way, the electronic computing device 302 may be operable to communicate, and a server or third party capable of receiving, the user-status-identifying image 100. In one embodiment, the user-status-identifying image 100 may be communicated through an electrical means, e.g., the Internet 310. In other embodiments, the user-status-identifying image 100 may be physically communicated to a non-user, e.g., a printed photo of the user-status-identifying image 100. After the user-status-identifying image 100 is received, the user-status-identifying image 100 may then be displayed to the viewing public to effectuate the end result of the present invention, i.e., relaying an image of a user while simultaneously communicating that user's relationship status or other personal status.

Step 214 may also include, in some instances, communicating the user-status-identifying image to a non-user of a social network 304. The term "communicating," in this sense, may also be considered a visual communication. The process then concludes in step 216.

The transfer of the user-status-identifying image 100 may occur over an exemplary network 300 as depicted in FIG. 3. The network 300 specifically illustrates a group of data processing systems through which one or more of the steps of the present invention may be implemented. The network 300 includes connections 308*a-n*, which are the medium used to provide communication links between various devices and computers, or computing devices, connected together within the network 300. The connections 308*a-n* may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, the network 300 includes the computing device 302, a social network server 306 which may be facilitating the operation of a social network 304. As such, the members, or users, of the social network 304 have access to a computing device, display, or other device communicatively coupled to the network 300 in order to view the user-status-identifying image 100. In one embodiment, the user-status-identifying image 100 (shown in FIG. 1) is communicated to the social network server 306 that relays or displays said image 100 to the social network 304. The user-status-identifying image 100 may be subject to viewing restrictions set forth or provided by each individual social network 304, e.g., a person is required to register with the social network before viewing others' images. Although FIG. 3 illustrates one social network 304, the present invention produces a user-status-identifying image 100 that is accessible to users on at least two different social networks 304.

The present invention may be implemented with the computing device 302 to produce the user-status-identifying image 100, which is then communicated to another person communicatively coupled on the network 300, e.g., through email. As referred to herein, the social network server 306 may represent a social media account residing on a computing device that is operable to communicate over a network, such as the one shown in FIG. 3. The user-status-identifying image 100 or user-identifying image 102 may be rendered or presented in a computer-readable medium such as .gif, .jpeg, .png, and the like, such that it is compatible by most, if not all, social networks 304.

In the depicted example, network 300 can include the Internet 310, which represents a worldwide collection of networks and gateways that use the TCP/IP suite of protocols to communicate with one another. At the heart of the Internet 310 is a backbone of high-speed data communication lines between major nodes or host computers, consisting of thousands of commercial, government, educational and other computer systems that route data and messages. Of course, network 300 also may be implemented as a number of different types of networks, such as for example, an Intranet, a local area network (LAN), or a wide area network (WAN). FIG. 3 is intended as an example, and not as an architectural limitation for the present invention.

The network 300 may include additional servers and other devices and entities not shown. In the depicted example, the computing device 302, which is represented as a mobile computing device, communicates with the social network server 306 to transmit the user-status-identifying image 100 to the social network 304. In other embodiments, the computing device 302 may communicate with the social network server 306 or other device coupled to the network 300 to receive an image of the user or to implement the steps of the present invention with an image located on another device coupled to the network 300. This type of data exchange may occur through the Internet 310, or another wireless or wired data exchange method, e.g., Bluetooth, radio frequency identification (RFD), or near field communications (NFC). Moreover, any of the depicted network entities, in addition to communicating with each other over the network 300, are, in some embodiments, also able to communicate in a peer-to-peer relationship using wired or wireless links. In embodiments of the present invention, various computing entities located on the network 300 may perform all, or some, of the above-described steps of the present invention represented in FIG. 2 or otherwise disclosed herein.

Figure 4:
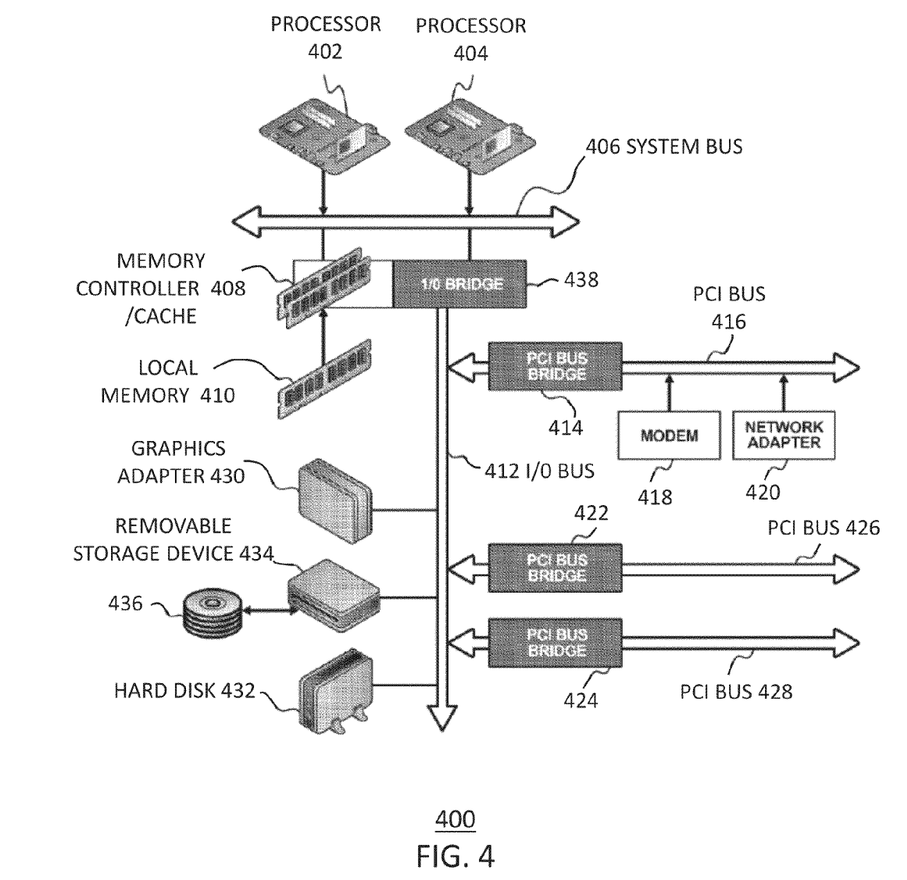
FIG. 4 is a block diagram of a data processing system that may be implemented as a network device, such as the computing device or social media server shown in FIG. 3, in accordance with an embodiment of the present invention.

Referring to FIG. 4, a block diagram of a data processing system 400 that may be implemented as a server or other computing device such as the electronic computing device 302 or social network server 306. Further, the system 400 may be implemented, whether in whole or in part, through a personal computer or terminal/computer/display associated with such computing device 302 or social network server 306, as shown in FIG. 3, in accordance with embodiments of the present invention. The data processing system 400 may be a symmetric multiprocessor (SMP) system including a plurality of processors 402 and 404 connected to system bus 406. Alternatively, a single processor system may be employed. Also, connected to system bus 406 is memory controller/cache 408, which provides an interface to local memory 410. An I/O bus bridge 438 is connected to system bus 406 and provides an interface to I/O bus 412. The memory controller/cache 408 and I/O bus bridge 438 may be integrated as depicted. The processors 402, 404 in conjunction with memory controller 408 control what data is stored in memory 410. The processor 402 and/or 404 and memory controller 408 can serve as a data counter for counting the rate of data flow to the memory 410 or from the memory 410 and can also count the total volume of data accessed to or from the memory 410. The processor 402 or 404 can also work in conjunction with any other memory device or storage location.

Peripheral component interconnect (PCI) bus bridge 414 connected to I/O bus 412 provides an interface to PCI local bus 416 that may be employed for one or more of the displays utilized for showing the user-status-identifying image 100. In addition, a number of modems 418, or wireless cards, may be connected to PCI bus 416. Typical PCI bus implementations will support four PCI expansion slots or add-in connectors. PCI includes, but is not necessarily limited to, PCI-X and PCI Express components. Communication links to the network 300 of computers or computing devices in FIG. 3 may be provided through the modem 418 and network adapter 420 connected to PCI local bus 416 through add-in boards.

Additional PCI bus bridges 422 and 424 provide interfaces for additional PCI buses 426 and 428, from which additional modems or network adapters may be supported. In this manner, the data processing system 400 allows connections to a multiple network of computers and/or computing devices. A graphics adapter 430 and hard disk 332 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The steps of the present invention, which are explained in more detail above, can be embodied in a computer program that is executable by one of the above-described processors 402, 404. Computer programs (also called computer control logic) are stored in memory such as main memory 410, removable storage drive 434; removable media 436, hard disk 432, and signals. Such computer programs, when executed, enable the computer system to perform the features of the present invention as discussed herein. In particular, the computer programs, when executed, enable the processor 402 and/or 404 to perform the steps of the present invention.

In this document, the terms "computer program medium," "computer usable medium," and "computer readable medium" are used to generally refer to media such as main memory 410, removable storage drive 434, removable media 436, hard disk 432, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may include computer readable information in a transitory state medium such as a network link and/or a network interface, including a wired or wireless network, that allows a computer to read such computer readable information.

As such, the electronic computing device 302 also includes a computing means, e.g., a processor, and a storing means, e.g., a memory. The processor is operable to run one or more programs/applications and interfaces associated with the electronic computing device 302 or stored on the memory in order to effectuate the data transfer and communications required by the present invention. The electronic computing device 302 may also have other components or features that may include an image capturing element configured to capture images and/or videos and software associated therewith that is operable to process images deriving from the image capturing element.

Figure 5:
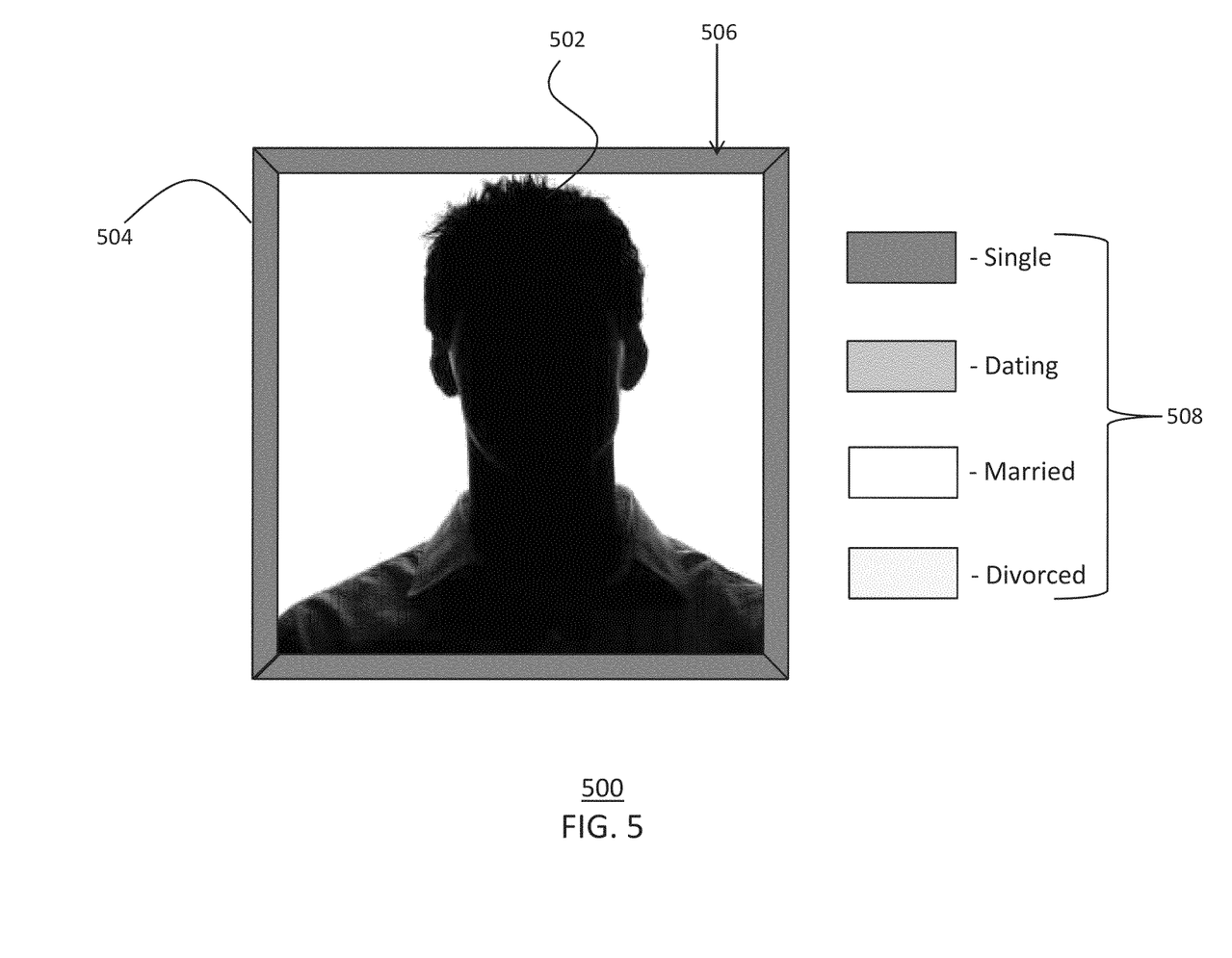
FIG. 5 is an illustrative view of a user-status-identifying image with a frame-like image having a particular color representing a personal-status identifier of a user in accordance with an embodiment of the present invention.
Figure 6:
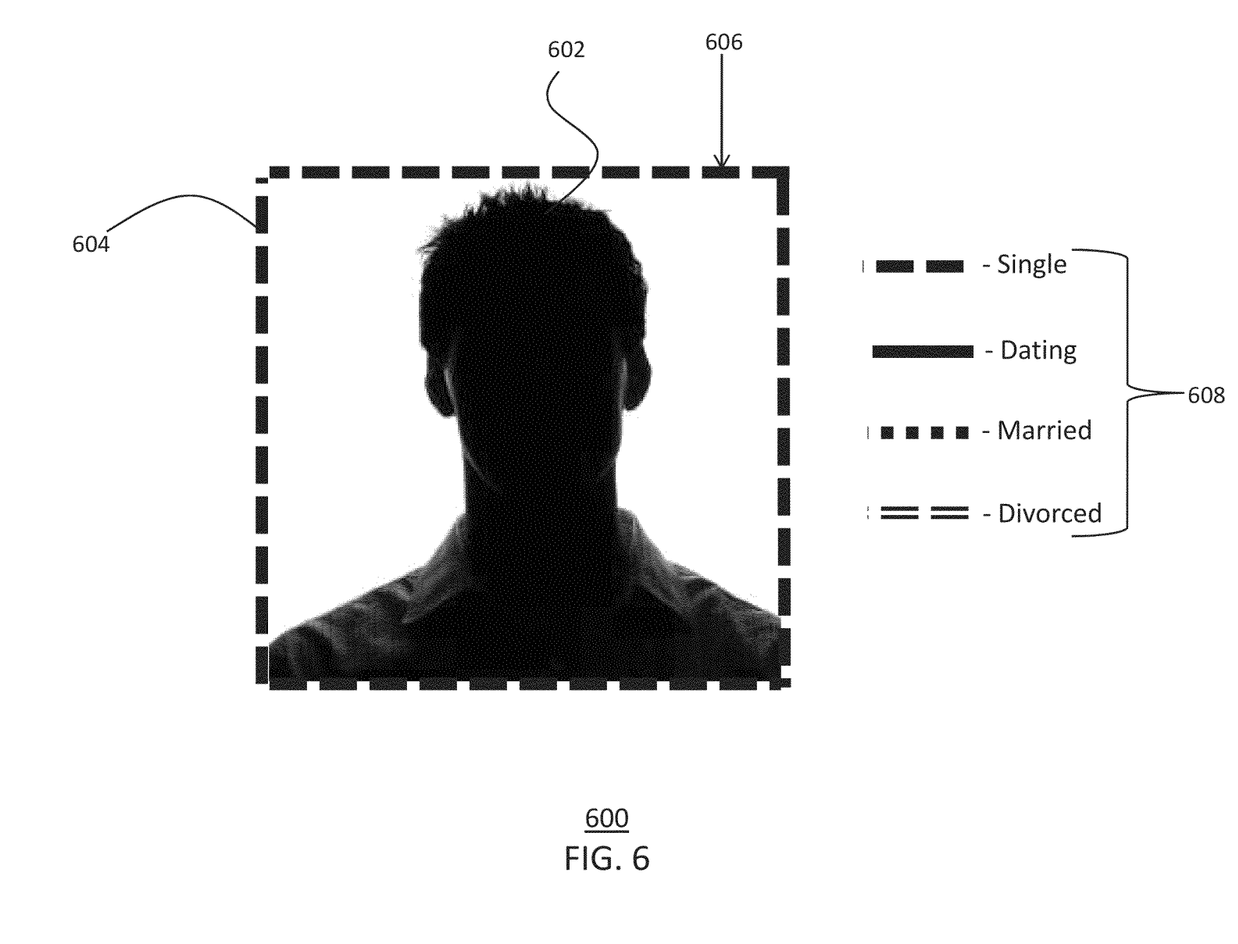
FIG. 6 is an illustrative view of a user-status-identifying image with a frame-like image having a particular pattern that represents a personal-status identifier of a user in accordance with an embodiment of the present invention.
Figure 7A:
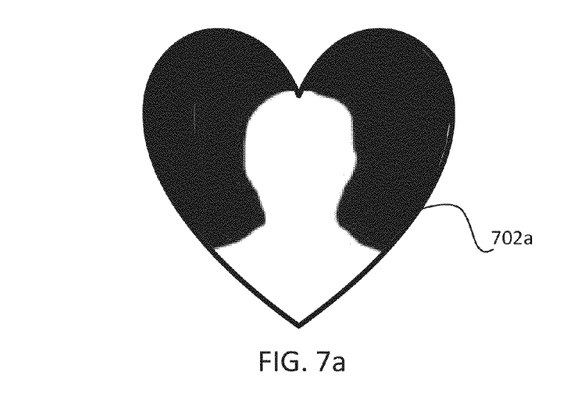
FIGS. 7a-d depict illustrative views of a user-status-identifying image with borders having a particular pattern that represents a personal-status identifier of a user in accordance with embodiments of the present invention.
Figure 7B:
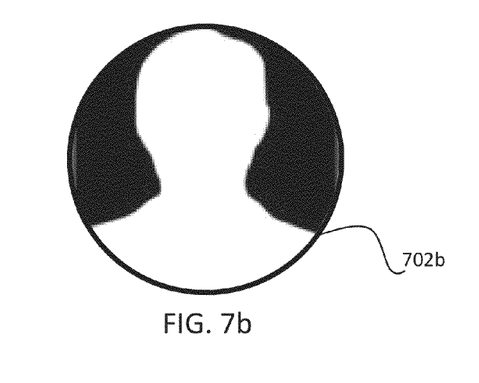
Figure 7C:
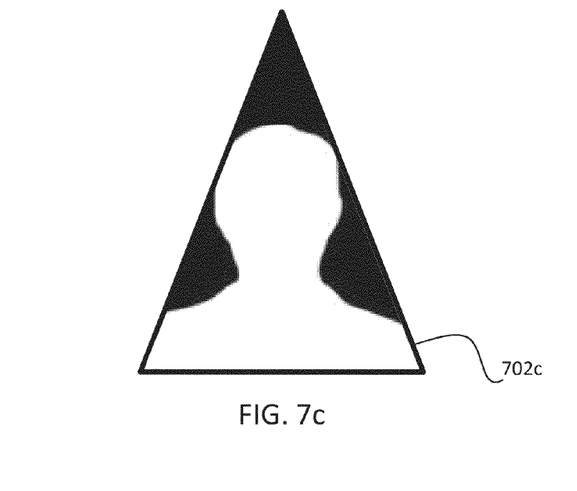
Figure 7D:
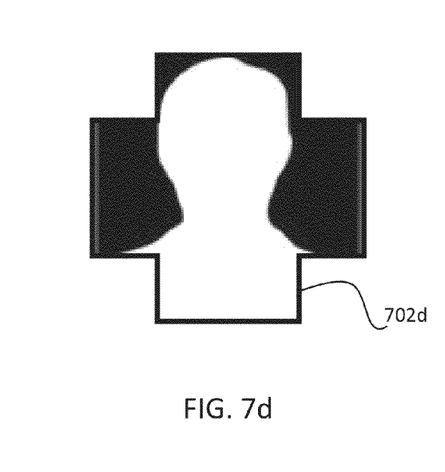

FIGS. 5 and 6 illustrate other embodiments of the user-status-identifying image 500, 600. As FIGS. 5 and 6 illustrate, the user's image 502, 602 has a frame-like image 504, 604 or border encapsulating the user's image 502. FIG. 5 depicts the unique visual perception characteristic 506 of the frame-like image 504 being a particular color associated with one of a plurality personal-status identifiers 508. FIG. 6 depicts the unique visual perception characteristic 606 of the frame-like image 604 or border depicted with a particular element of design or pattern associated with one of a plurality personal-status identifiers 608. In the embodiment shown in FIG. 6, the element of design is various dash lines. In other embodiments, as shown in FIGS. 7a-d, the element of design for the borders 702a-d may be various shapes, in addition to being configured with different geometries, content, or orientations that represent a particular personal status identifier of a user. For example, the heart-shaped border 702a may represent "single and looking for love," while a triangular-shaped border 702c may represent "divorced."

A method of displaying a user's relationship status has been disclosed that effectively and efficiently displays or communicates the image of user while simultaneously displaying that user's relationship status. The present invention may also be configured to display various other personal statuses of user, such as emotional status of the user. As such, the present invention enables a person to quickly communicate his or her current relationship status, and in some embodiments the user's desired relationship status, which helps effectuate conversations that may ultimately lead to a relationship and perhaps, love.

What is claimed is:

1. A method of displaying a user's relationship status, the method comprising:
   receiving a user-identifying image, depicting a user's face, at an electronic computing device;
   selecting, at the electronic computing device, from a plurality of pre-defined recognizable personal-status identifiers at least one personal-status identifier indicative of a personal status of the user;
   at least partially surrounding the user-identifying image with a frame-like image, by the electronic computing device, the frame-like image having a unique visual perception characteristic corresponding to the selected at least one personal-status identifier indicative of a personal status of the user and leaving the user-identifying image substantially unobstructed such that the user's face is not encroached by the frame-like image and the user's face is not altered; and
   uploading the user-identifying image with the frame-like image to at least two different social networks so that the image is visually accessible to users on the at least two different social networks.

2. The method according to claim 1, wherein:
   the at least two different social networks are not affiliated with one another.

3. The method according to claim 1, wherein the user-identifying image comprises at least one of:
   a user's physical likeness; and
   a user's facial likeness.

4. The method according to claim 1, wherein:
   the electronic computing device is a mobile electronic computing device.

5. The method according to claim 1, wherein:
   the unique visual perception characteristic is at least one of a color and a pattern.

6. The method according to claim 1, wherein at least one of the user-identifying image and the frame-like image further comprises:
   a source indicator coupled thereto, the source indicator providing the users on the at least two different social networks access to the list of pre-defined recognizable personal-status identifiers and their associated unique visual perception characteristic.

7. The method according to claim 1, further comprising:
   providing a key having a list of the pre-defined recognizable personal-status identifiers and their associated unique visual perception characteristic; and
   making the key accessible to at least one user.

8. The method according to claim 7, wherein:
   access to the key is restricted to members of an exclusive group.

9. A method of displaying a user's relationship status, comprising the steps of:
   communicating an image of a user's physical likeness to an electronic computing device;
   selecting, at the electronic computing device, one of a plurality of pre-defined recognizable personal-status identifiers indicative of a personal status of the user;
   substantially encapsulating the image of the user's physical likeness with a border, by the electronic computing device, the border leaving the image of the user's physical likeness substantially unobstructed and having a unique visual perception characteristic corresponding to the selected pre-defined personal-status identifier;
   associating the border with a hyperlink to an Internet domain providing access to the pre-defined personal-status identifier corresponding with the border;
   receiving, from the electronic computing device, the image of the user's physical likeness with the border at a social network, the social network having a social network server communicatively coupled over a network with the electronic computing device; and
   displaying the image of the user's physical likeness with the border to users on the social network.

10. The method according to claim 9, further comprising:
    receiving the image of the user's physical likeness with the border at at least two different social networks, the at least two different social networks each having a social network server communicatively coupled over a network with the electronic computing device; and
    displaying the image of the user's physical likeness with the border to users on the at least two different social networks.

11. The method according to claim 10, wherein:
    the at least two different social networks are not affiliated with one another.

12. The method according to claim 9, wherein:
    the electronic computing device is a mobile electronic computing device.

13. The method according to claim 9, wherein at least one of the image of the user's physical likeness and the border further comprises:
    a source indicator coupled thereto, the source indicator providing the users on the at least two different social networks access to the list of pre-defined recognizable personal-status identifiers and their associated unique visual perception characteristic.

14. The method according to claim 9, wherein:
    the unique visual perception characteristic is at least one of a color and a pattern.

15. The method according to claim 9, wherein the image of the user's physical likeness comprises:
    a user's facial likeness.

16. The method according to claim 9, further comprising:
    providing a key having a list of the pre-defined recognizable personal-status identifiers and their associated unique visual perception characteristic; and
    making the key accessible to at least one user.

17. A computer readable medium having embodied thereon a program, the program being executable by a processor for performing a method for displaying a user's relationship status, the method comprising:

accessing a user-identifying image;

selecting from a plurality of pre-defined recognizable personal-status identifiers at least one personal-status identifier indicative of a personal status of the user;

selecting from a plurality of pre-defined recognizable secondary personal-status identifiers at least one secondary personal-status identifier indicative of a personal status of the user;

at least partially surrounding the user-identifying image with a frame-like image, the frame-like image having a unique visual perception characteristic corresponding to the selected at least one personal-status identifier indicative of a personal status of the user, having another unique visual perception characteristic corresponding to the selected at least one secondary personal-status identifier indicative of a personal status of the user, and leaving the user-identifying image substantially unobstructed; and     uploading the user-identifying image with the frame-like image to at least two different social networks so that the image is visually accessible to users on the at least two different social networks.

18. The computer readable medium according to claim 17, wherein:

the at least two different social networks are not affiliated with one another.

19. The computer readable medium according to claim 17, further comprising:

accessing the user-identifying image from a database located on an electronic computing device.

20. The computer readable medium according to claim 17, wherein:

the unique visual perception characteristic is at least one of a color and an element of design.

* * * * *